March 2, 1965
C. J. GRIFFITH
3,171,554
LOADER ATTACHMENT FOR TRACTORS
Filed Oct. 2, 1961
2 Sheets-Sheet 1
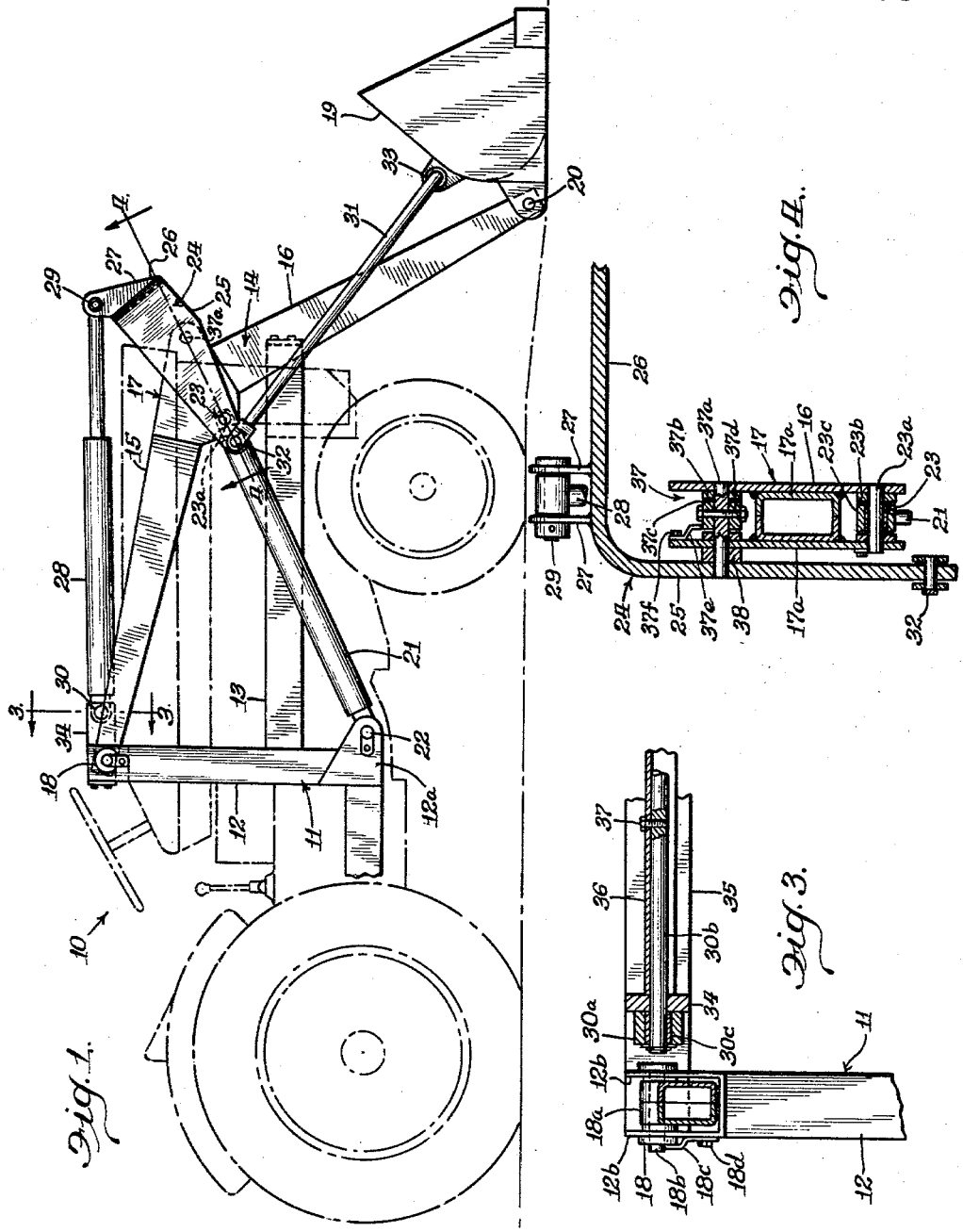
Inventor:
Clifford J. Griffith
Paul O. Pippel
Atty.

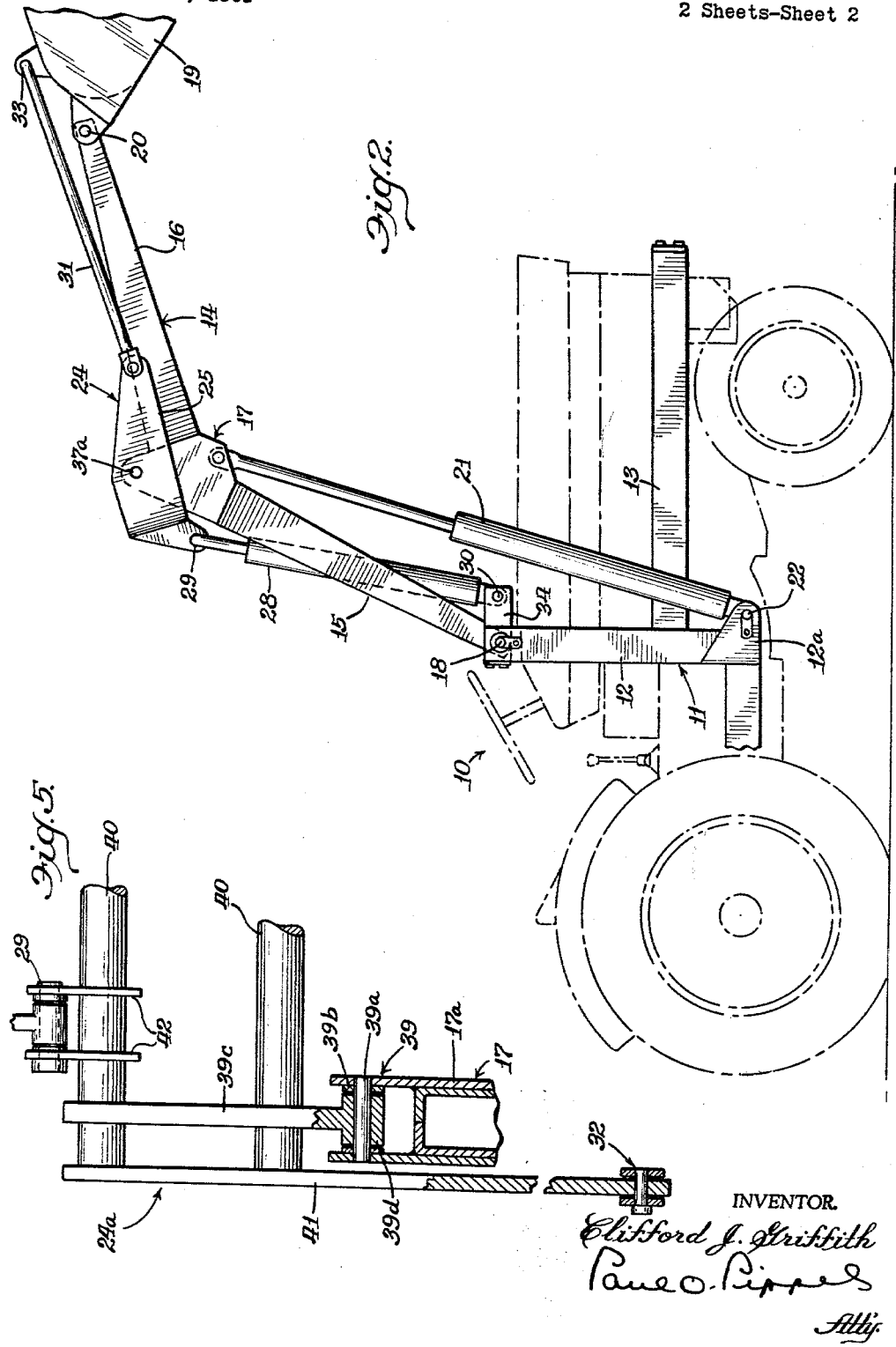

United States Patent Office 3,171,554
Patented Mar. 2, 1965

3,171,554
LOADER ATTACHMENT FOR TRACTORS
Clifford J. Griffith, Westmont, Ill., assignor to International Harvester Company, Chicago, Ill., a corporation of New Jersey
Filed Oct. 2, 1961, Ser. No. 142,376
10 Claims. (Cl. 214—140)

This invention relates generally to loading attachments for mounting on vehicles, such as tractors. More particularly, it relates to support means including an improved boom and linkage means for mounting a loader attachment on an agricultural tractor.

A typical tractor-mounted loader attachment will normally include a pair of generally parallel forwardly extending lift arms or boom arms having their rear ends connected to pivots at opposite sides of a tractor, respectively. The arms extend forwardly of the tractor to carry a tool or work implement, such as a bucket. Primary moving means, such as hydraulic rams, are generally provided in order to pivot the boom arms, thus raising and lowering the bucket. Secondary moving means connected through suitable linkage are provided to pivot the bucket from a loading to a carrying position.

Both the tractor and the attachment should be versatile enough to allow one form of attachment to be used with different types of tractors, particularly tractors of various manufacture. However, agricultural tractors, although generally similar in design, often embrace dimensional differences that create problems in the mounting of loader attachments thereon. A loader specifically designed to fit a certain tractor is often difficult or impossible to attach to another tractor.

Conventional loader attachments are generally provided with a linkage and cylinder arrangement limited to a maximum bucket rollback of approximately 145°, and in which power must be applied for self-leveling of the bucket.

Accordingly, it is an object of this invention to provide a loader attachment which is interchangeable with a variety of tractors.

It is another object of this invention to make a lightweight attachment which is easily attachable to and detachable from a tractor.

It is a further object of this invention to provide a simple and economical loader attachment which may be used with tractors of various designs without modification.

Another object of this invention is to provide a frontend-type tractor loader attachment with a unique pivot and linkage arrangement which provides for use of the attachment in conjunction with different types of tractors.

Still another object of this invention is to provide a front-end-type tractor loader attachment with a linkage arrangement for pivoting the bucket, which arrangement provides for uniform operation of power-driving means under unequal loading conditions.

Another object of this invention is to provide an arrangement for a pair of boom arms in a tractor loader attachment which may be light in construction and wherein linkage means controlling the pivoting of the bucket allow for uniform operation of its power means under unequal loading conditions.

Yet another object of this invention is to provide a loader attachment having a linkage and cylinder arrangement allowing extensive bucket rollback.

Another object of this invention is to provide a self-leveling loader attachment having a linkage arrangement which rolls the bucket ahead through mechanical means rather than through application of hydraulic power as the boom is raised.

A further object of this invention is to provide increased breakout in a bucket-cutting edge at ground level through increasing leverage around the bucket rear hinge point with the bucket flat on the ground by means of allowing increased bucket rollback.

Other objects and advantages of this invention will be more apparent upon examination of the following disclosure, in which:

FIGURE 1 is a side-elevational view showing a tractor with the loader attachment mounted thereon, showing the bucket in the lowered or loading position;

FIGURE 2 shows the tractor and the loader attachment with the bucket in a high-dumping position;

FIGURE 3 is a fragmentary cross-sectional view showing the mounting and supporting structure for the boom support and certain of the hydraulic rams;

FIGURE 4 is a fragmentary cross-sectional view showing details of the mounting and pivot assembly for the linkage structure; and FIGURE 5 is a fragmentary cross-sectional view showing details of a modified mounting and pivot assembly for the linkage structure.

Upon an agricultural tractor of the four-wheel rubber-tired type is mounted a loader attachment. The loader attachment comprises a boom mechanism having two similar and corresponding sides, only one of which need be described in detail. It includes a pair of boom arms disposed on each side of the tractor, the rear ends of which are pivotally connected to a boom support assembly firmly fixed to the tractor. The forward ends of the boom arms carry the bucket. The boom arms are rigidly interconnected through the boom support assembly, but may be operated independently under differential loading conditions. They are further interconnected, although not rigidly, by a relatively light U-shaped lever assembly which provides the base for the linkage assembly that pivots the bucket. Suitable hydraulic rams are provided to pivot the boom arms and the bucket.

As seen in FIGURES 1 and 2, secured to the agricultural tractor 10 is the boom support 11 including the upstanding beam 12 and the forwardly extending beam 13. The anchor bracket 12a extends forwardly from the bottom portion of beam 12 while its top portion is provided with the bracket members 12b.

The rigid boom arm 14 includes a rearwardly extending portion 15, a forwardly extending portion 16, and an intermediate frame portion 17. Boom 14 is connected by means of the pivot 18 to bracket 12b of beam 12. The loading implement or bucket 19 is connected to the forward portion 16 of boom 14 by means of the pivots 20. The double-acting hydraulic ram 21 is attached to anchor bracket 12a of beam 12 by means of pivotal connection 22. Hydraulic ram 21 is attached to the frame portion 17 of boom 14 through pivotal connection 23, as will be more fully described later.

The U-shaped interconnecting bracket or lever 24 includes side members or legs 25 and the central cross-member 26 interconnecting legs 25. Extending outwardly from plate 26 are the flanges 27 to which the double-acting hydraulic ram 28 is connected by means of pivot 29. Hydraulic ram 28 is also connected by the pivot 30 to the tie-rod 35, more fully to be described later. The linking member 31 is secured at one end by means of the pivot 32 to an end portion of leg 25 and at its other end by means of the pivot 33 to bucket 19.

Turning now to FIGURE 3, it will be seen that the rear portion 15 of boom arm 14, which in this case may be a tubular member, is secured to race 18a of the pivotal joint or bearing 18. Race 18b is rigidly mounted on brackets 12b of the upstanding boom 12 and is secured by means of locking element 18c held in place by locking nut 18d. Hydraulic ram 28 includes the eye element 30a forming a portion of pivot 30. The inner rod 30b rides in the bushing 30c and is securely fixed between protruding elements 34 of the tie-rod 35 rigidly interconnecting the beams 12. Rod 30b is secured within the bracing element 36 by means of fasteners 37, and this element 36 is, in turn, secured to elements 34. Thus, it will be seen that boom 14 and hydraulic rams 28 are independently pivotally connected to the upper portion of boom support 11 while the tie-rod 35 serves to rigidly interconnect and secure the beams 12 of boom support 11 from lateral stress.

As clearly shown in FIGURE 4, the U-shaped lever 24 is provided with legs 25 and interconnecting crossmember 26. The upstanding flanges 27 are located adjacent the extremities of crossmember 26 to provide a mounting for the pivot 29 carrying hydraulic ram 28. Such orientation of the flanges provides a small lever arm between the planes of hydraulic ram 28 and linking member 31 attached to pivot 32, resulting in the transmittal of force with a minimum of torque, thus allowing lever 24 to be constructed from a material light in weight relative to boom arm 14. This insures that lever 24 does not rigidly interconnect intermediate frame portions 17 of boom arms 14 and interfere with the independent operation thereof.

Frame portion 17 comprises plates 17a to which boom portions 15 and 16 are securely attached as by welding. Pivotal connection 23 includes the shaft 23a which is securely mounted within extensions 23b forming part of plates 17a. Pivotally mounted on the shaft 23a is the eye element 23c to which is fastened one end of hydraulic ram 21.

The pivotal connection or bearing 37 serves as the means by which U-shaped lever 24 is attached to frame portion 17. Bearing 37 includes shaft 37a which is placed between and extends beyond one of the extensions 37b forming parts of plates 17a. The sleeve 37c is secured to shaft 37a by means of the pin 37d and the bearing locking element 37e is mounted by conventional means such as the nut 37f. The sleeve 38, which is securely affixed to leg 25, is mounted concentrically on shaft 37a, about which the entire U-shaped lever 24 is freely rotatable.

Suitable pumps, valves, fluid control lines, etc. (not shown) are provided for the operation of hydraulic rams 21 and 28.

From the foregoing, it will be obvious that actuation of hydraulic rams 21 causes boom arms 14 to pivot about bearings 18, resulting in the raising and lowering of bucket 19 between loading, carrying, and dumping positions. The independent operation of boom arms 14 compensates for twisting or torque forces on the entire attachment due to unequal loads or resistances at the bucket 19 encountered during normal operation. This is made possible because the light weight of U-shaped lever 24 relative to boom arms 14 does not provide rigidity therebetween. Due to the fact that boom arm 14 swings about pivot 18 while hydraulic ram 28 swings about pivot 30, U-shaped lever 24, upon actuation of hydraulic ram 21, will swing about its pivot 37 in a clockwise direction (as seen in FIGURE 1) and cause bucket 19 to be tilted rearwardly as boom arm 14 raises. Bucket 19 thus assumes a favorable carrying position in its raised or loaded position.

Actuation of hydralic rams 28 cause pivotal movement of the U-shaped lever 24 which, through linking members 31, causes pivoting of bucket 19 to its desired positions. U-shaped lever 24 is designed to freely pivot upwardly of the engine housing and forwardly of the radiator cowling of tractor 10. Sufficient clearances for this movement are maintained, such that the attachment may be mounted for use upon tractors of various manufacture. Levers 24, while light in weight is made strong enough to equalize the load placed upon the rams 28 in the event of an obstruction to pivotal movement of the bucket 29 as it is used in its various positions.

The mechanical linkage arrangement described hereinabove provides approximately twice the rollback for the bucket as do conventional loader attachments. Further, as the breakout moment arm is increased, smaller cylinders may be used resulting in a reduction in the oil requirements. Retracting to dump, which requires pumping oil to the rod side of the cylinder rather than to the piston side, further reduces the oil requirement.

No hydraulic power is applied to achieve self-leveling, as the bucket inherently rolls ahead when the boom is raised due to the unique mechanical linkage arrangement.

Turning now to FIGURE 5, it will be seen that a modified U-shaped lever 24a may be attached to frame portion 17 by means of pivotal connection or bearing 39. Bearing 39 includes shaft 39a which is positioned between the extension 39b forming parts of plates 17a. The plate 39c has formed at one end thereof the sleeve 39d which cooperates with shaft 39a to form a pivotal connection. A pair of shafts or crossmembers 40 are secured to plates 39c and extend therebeyond to form supports for legs or side members 41. Upon legs 41 are mounted pivots 32 in the same manner as on legs 25 of U-shaped level 24. To the outer of the two crossmembers 40 are secured plates 42 forming flanges to which pivot 29 is secured in the same manner as on crossmember 26 of U-shaped lever 24.

While the preferred embodiment of my invention has been shown and described, it will be readily apparent that modifications thereto may be made without deviating from the scope of the following claims.

I claim:

1. In combination, a tractor and a loader attachment therefor, said loader attachment comprising a pair of boom arms disposed on opposite sides of said tractor and pivotally mounted at one end thereof to the tractor and extending forwardly therefrom, a bucket pivotally attached to the other end of said boom arms, each boom arm including an intermediate frame member, a U-shaped lever extending between said arms from said frame members across said tractor adjacent the front thereon, said U-shaped lever being connected to respective frame members for pivotal movement between one position above said tractor and another position in front of said tractor, linkage means connected at one end thereof to said U-shaped lever and at the other end thereof to said bucket, power means connected to said frame members for raising and lowering said bucket, and means connected to said U-shaped lever for pivoting said bucket relative to said boom arms.

2. In combination, a tractor and a loader attachment therefor, said loader attachment having a pair of independent boom arms each pivotally connected to opposite sides of said tractor and extending forwardly therefrom, a bucket pivotally connected to the forward end of each of said boom arms, a frame on each of said boom arms intermediate its ends, a pair of hydraulic rams each mounted on opposite sides of said tractor and connected to said frames for raising and lowering said boom arms, a U-shaped lever having a pair of leg members and an interconnecting crossmember, means pivotally mounting each of said leg members on respective frames so that said U-shaped lever extends from said frames and across said tractor and is pivotal between one position above said tractor and another position in front of said tractor, said U-shaped lever being of a size small enough relative to said boom arms so that said U-shaped lever offers substantially no rigidity to said boom arms, a pair of extensible and retractable members each on opposite sides of said tractor each pivotally connected to said interconnecting crossmember in an area adjacent to respective leg members, a pair of link elements each pivotally connected at one end thereof to respective leg members and at the other end thereof to said bucket, said U-shaped lever being of a size large enough relative to the available forces of said extensible and retractable members so that substantially no twisting of said U-shaped lever will occur whereby each of said extensible and retractable members pivot said U-shaped lever equally irrespective of any unequal loading forces on said bucket.

3. In a loader attachment adapted for use on a tractor, boom means including a pair of independent boom arms each having a rear portion, a forward portion, and an intermediate portion and adapted to be disposed on opposite sides of the tractor and extend forwardly therefrom, pivot means mounted on said rear portions and adapted to engage cooperating pivot means on the tractor whereby said boom means may be pivotally secured to the tractor, implement means, means pivotally mounting said implement means on the forward portions of said boom arms, first hydraulic ram means, means pivotally connecting said first hydraulic ram means to said intermediate portions whereby actuation of said first hydraulic ram means causes pivotal movement of said boom means relative to the tractor and raising and lowering of said implement means, U-shaped lever means including a crossmember adapted to extend from one side to the other of the tractor and a pair of side members, each of said side members being rigidly connected to and extending substantially perpendicularly from the ends of said crossmember, respectively, a plurality of connection members rigidly connected to said crossmember adjacent the ends thereof and extending perpendicularly therefrom at an acute angle relative to said side members, means pivotally engaging each of said side members at a point relatively near said crossmember with each of said frame portions, respectively, elongated link means pivotally mounted at one end thereof to said side members at a point relatively far from said crossmember and at the other end thereof to said implement means, second hydraulic ram means, and means pivotally connecting said second hydraulic ram means to said connection members whereby actuation of said second hydraulic ram means causes pivotal movement of said implement means relative to said forward portions of said boom arms.

4. In a loader attachment adapted for use on a tractor, a pair of independent boom arms adapted to be disposed on opposite sides of the tractor and extend forwardly therefrom, each boom arm having a rear portion adapted to be pivotally secured to the tractor, a forward portion and an intermediate portion, each of said intermediate portions having spaced substantially parallel elongated inner and outer plates rigidly joining said rear and forward portions, each of said intermediate portions having a first shaft secured between said plates at one end thereof and a second shaft secured between said plates at the other end thereof and extending outwardly from said outer plate, implement means pivotally mounted on said forward portions, first hydraulic ram means connected to said first shaft whereby actuation of said first hydraulic ram means causes pivotal movement of said boom arms relative to the tractor and raising and lowering of said implement means, U-shaped lever means including a crossmember adapted to extend from one side to the other of the tractor for pivotal movement above and forwardly thereof and a pair of leg members each having a sleeve thereon intermediate the ends thereof, means rotatably mounting each of said sleeves on respective second shafts outwardly of said outer plates, elongated link means pivotally connected at one end thereof to each of said leg members and at the other end thereof to said implement means, second hydraulic ram means connected to said crossmember adjacent the ends thereof, whereby actuation of said second hydraulic ram means causes pivotal movement of said implement means relative to said boom arms.

5. In a loader attachment adapted for use on a tractor, boom support means mounted on the tractor and having first pivot means at the upper end thereof and second pivot means at the lower end thereof, tie-rod means rigidly interconnecting said boom support means at the upper end thereof, third pivot means mounted on said tie-rod means, a pair of independent boom arms each having a rear portion connected to said first pivot means, a forward portion and an intermediate portion and adapted to be disposed on opposite sides of the tractor and extend forwardly therefrom, each of said intermediate portions having spaced substantially parallel elongated inner and outer plates, said rear and forward portions being rigidly joined between said plates, first shaft means secured between said plates adjacent one end thereof, second shaft means secured between said plates at the other end thereof and extending outwardly from said outer plate, implement means having fourth pivot means thereon, said forward portions of said boom arms being connected to said fourth pivot means, first hydraulic ram means connected at one end thereof to said second pivot means and being pivotally connected at the other end thereof to said first shaft means whereby actuation of said first hydraulic ram means causes pivotal movement of said boom arms relative to the tractor and raising and lowering of said implement means, U-shaped lever means including a crossmember adapted to extend from one side to the other of the tractor for swinging movement upwardly and forwardly thereof and a pair of legs, each of said legs having a sleeve secured thereto intermediate the ends thereof, means rotatably mounting each of said sleeves on each of said second shaft means, respectively, outwardly of said outer plates, elongated link means pivotally connected at one end thereof to each of said legs and at the other end thereof to said implement means, and second hydraulic ram means connected at one end thereof to said third pivot means and being pivotally connected at the other end thereof to said crossmember adjacent its ends whereby actuation of said second hydraulic ram means causes pivotal movement of said implement means relative to said boom arms, said U-shaped lever means being of a size small enough relative to said boom arms so that said U-shaped lever means offers substantially no rigidity to said boom arms and of a size large enough relative to the available force of said second hydraulic ram means so that substantially no twisting of said U-shaped lever means will occur as said second hydraulic ram means pivot said U-shaped lever means irrespective of any unequal loading forces on said implement means.

6. In a self-leveling loader attachment adapted for use on a tractor, a boom support adapted to be mounted on the tractor, a pair of boom arms pivotally secured at one end thereof to said boom support and adapted to be disposed on opposite sides of the tractor and extend therefrom, an implement pivotally mounted on the other end of said boom arms, an interconnecting U-shaped lever pivotally connected to each of said boom arms intermediate the ends thereof and adapted for pivotal movement above and forwardly of the tractor, linkage means connecting said U-shaped lever and said implement, first power means connected between said boom support and said boom arms for raising and lowering said boom arms, and second power means connected between said boom support and said U-shaped lever for pivoting said implement.

7. In the loader attachment according to claim 6, said boom support including a pair of upstanding beams adapted to be disposed on opposite sides of the tractor, a tie-rod rigidly interconnecting said beams at the upper ends thereof and adapted to extend across the tractor from one side to the other, said boom arms being pivotally secured to said beams at the upper ends thereof, said first power means comprising a first pair of hydraulic rams pivotally secured to said beams at the lower ends thereof, and said second power means comprising a second pair of hydraulic rams pivotally secured to said tie-rod adjacent the ends thereof.

8. In the loader attachment according to claim 6, said

U-shaped lever including a crossmember and a pair of leg members, each of said leg members being pivotally connected intermediate the ends thereof to respective boom arms, said linkage means comprising a pair of link elements each connected to respective leg members adjacent one end thereof, and said second power means being connected to said crossmember adjacent the ends thereof.

9. In the loader attachment according to claim 7, said U-shaped lever including a crossmember and a pair of leg members, each of said leg members being pivotally connected intermediate the ends thereof to respective boom arms, said linkage means comprising a pair of link elements each connected to respective leg members adjacent one end thereof, and said second pair of hydraulic rams being pivotally secured to said crossmember adjacent the ends thereof.

10. In a loader adapted for use on a vehicle, a pair of independent boom arms adapted to be disposed on opposite sides of the vehicle and extend forwardly therefrom, each boom having a rear portion adapted to be pivotally secured to the vehicle, a forward portion and an intermediate portion, each of said intermediate portions having spaced substantially parallel elongated inner and outer plates rigidly joining said rear and forward portions, each of said intermediate portions having first and second shafts secured between said plates at respective ends thereof, implement means pivotally mounted on said forward portions, first hydraulic ram means connected to said first shaft whereby actuation of said first hydraulic ram means causes pivotal movement of said boom arms relative to the vehicle and raising and lowering of said implement means, U-shaped lever means including spaced substantially parallel crossmembers adapted to extend from one side to the other side of the vehicle for pivotal movement above and forwardly thereof and a pair of leg members, means pivotally mounting said crossmembers to each of said second shafts, elongated link means pivotally connected at one end thereof to each of said leg members and at the other end thereof to said implement means, and second hydraulic ram means connected to at least one of said crossmembers adjacent the ends thereof whereby actuation of said second hydraulic ram means causes pivotal movement of said implement means relative to said boom arms.

References Cited in the file of this patent

UNITED STATES PATENTS

| | | |
|---|---|---|
| 2,488,699 | Anthony | Nov. 22, 1949 |
| 2,688,631 | Reese | Feb. 9, 1954 |
| 2,790,256 | Beyerstedt | Apr. 30, 1957 |

OTHER REFERENCES

John Deere 720 Loader, PD1–U13338U, received in Patent Office May 22, 1961.